(No Model.) 2 Sheets—Sheet 1.
D. F. HULL.
GRAIN DRILL AND FERTILIZER DISTRIBUTER.
No. 282,456. Patented July 31, 1883.
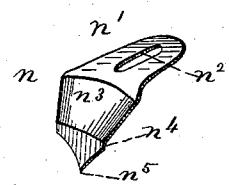
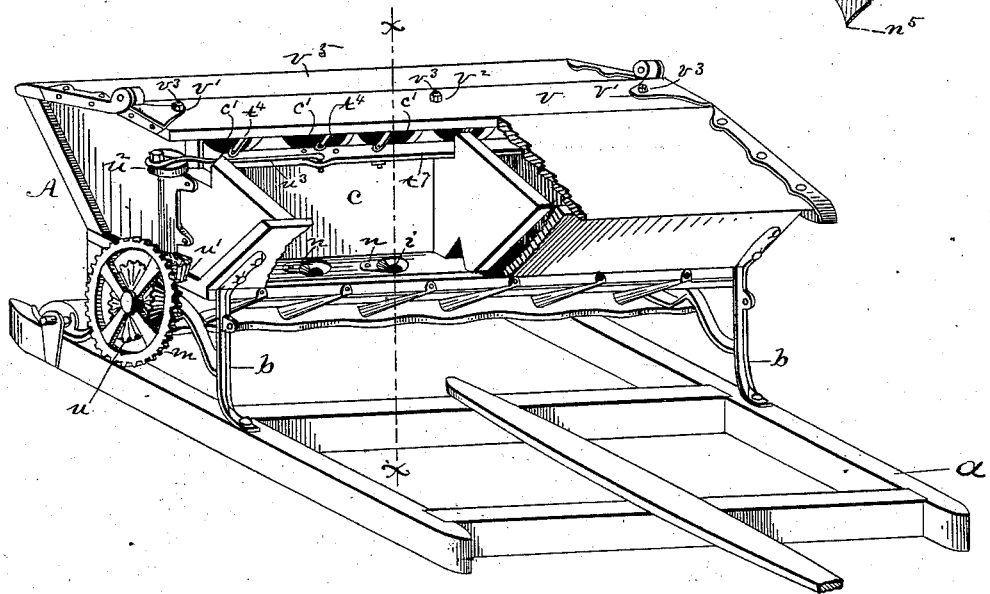
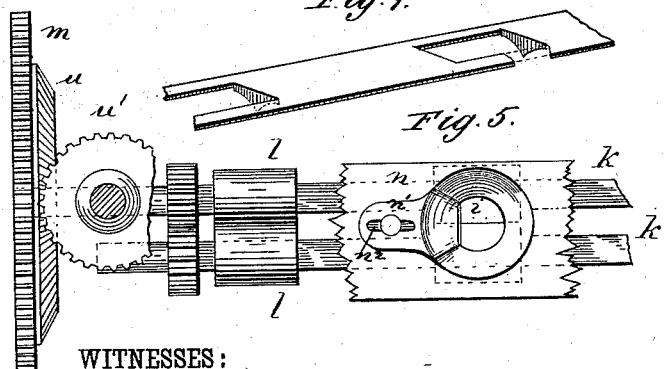
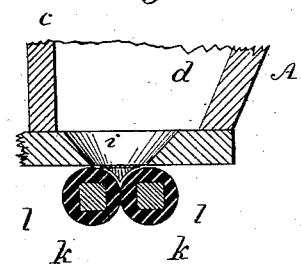
WITNESSES:
Thos. Houghton.
W. Read
INVENTOR:
David F. Hull
BY Munn & Co.
ATTORNEYS.
N. PETERS. Photo-Lithographer, Washington, D. C.

(No Model.) 2 Sheets—Sheet 2.
D. F. HULL.
GRAIN DRILL AND FERTILIZER DISTRIBUTER.
No. 282,456. Patented July 31, 1883.
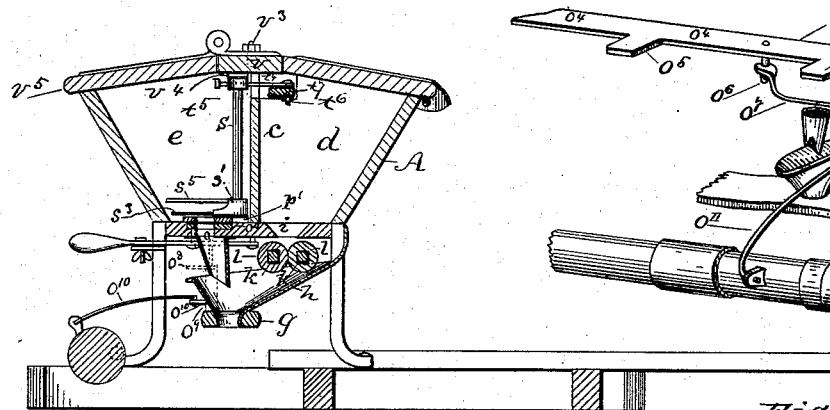
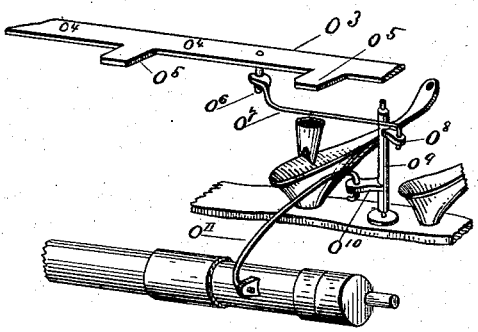
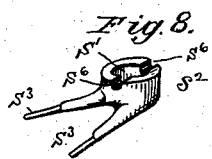
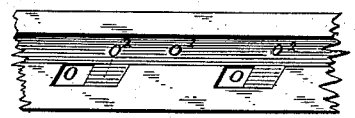
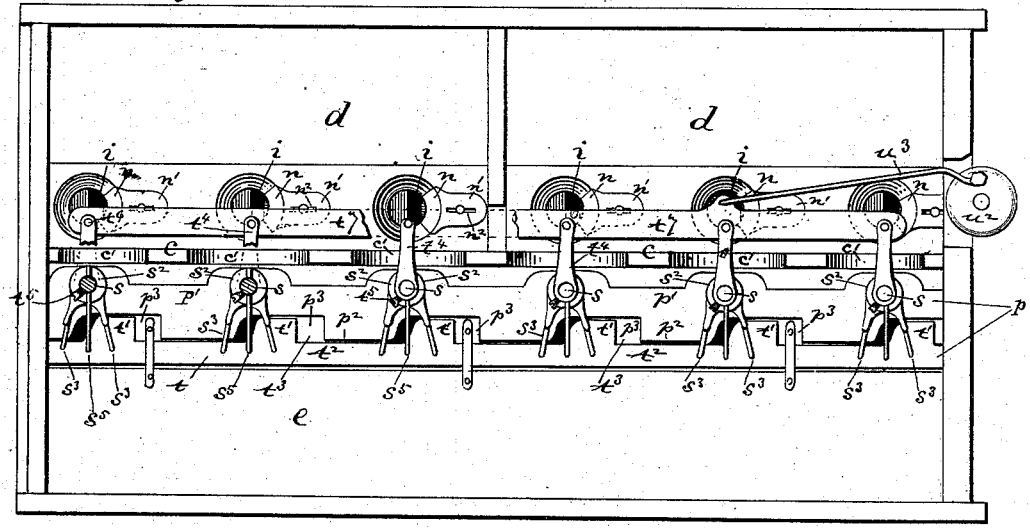
WITNESSES:
Thos. Houghton.
W. Ready
INVENTOR:
David F. Hull
BY Munn & Co.
ATTORNEYS.

UNITED STATES PATENT OFFICE.

DAVIT F. HULL, OF HAGERSTOWN, MARYLAND.

GRAIN-DRILL AND FERTILIZER-DISTRIBUTER.

SPECIFICATION forming part of Letters Patent No. 282,456, dated July 31, 1883.

Application filed February 19, 1883. (No model.)

*To all whom it may concern:*

Be it known that I, DAVIT F. HULL, of Hagerstown, in the county of Washington and State of Maryland, have invented a new and useful Improvement in a Grain-Drill and Fertilizer-Distributer; and I do hereby declare that the following is a full, clear, and exact description of the same, reference being had to the accompanying drawings, forming part of this specification, in which—

Figure 1 is a perspective view of my improved grain-drill and fertilizer, partly broken away to show the interior. Fig. 2 is a plan of the same with the hopper-covers removed. Fig. 3 is a transverse section in the line $x\,x$ of Fig. 1. Figs. 4, 5, 6, 7, 8, 9, and 10 are detail views.

My invention relates to improvements in grain-drills and fertilizer-distributers; and it consists, first, of an adjustable keeper of peculiar construction, adapted to conform with the concave surface of each seed-opening, and provided with a pointed lower end, arranged between the ordinary gum-rollers of the drill to prevent the lateral discharge of the grain in passing said rollers.

My invention further consists in certain devices, hereinafter more fully set forth, whereby the flow of fertilizer from the distributer is stopped in turning the machine, or whenever desired.

My invention also consists in certain details of construction, hereinafter more fully set forth.

In the accompanying drawings, $a$ represents the frame of the machine, supported on wheels and provided with the end stands, $b$, which support the receptacle A, divided longitudinally by the partition $c$ into the two compartments $d\,e$, the former for the reception of grain and the latter for fertilizers.

$g$ represents a horizontal board secured to the lower ends of the stands $b$ and supporting the shoes $h$, the latter lying under the seed-openings in the bottom of the grain-hopper, and also under the fertilizer-openings in the bottom of the fertilizer-hopper. The lower end of each shoe $h$ is provided with an opening, which extends through the horizontal board $g$, whereby the grain and fertilizer are together deposited on the ground. The grain-drill is provided with the ordinary reciprocating slide.

$k\,k$ represent two parallel horizontal square shafts, journaled in the frame of the machine just below the bottom of the grain-hopper. These shafts are provided each, just below and opposite each seed-opening $i$, with a cylindrical gum roller, $l$, between which rolls $l$ the grain passes as it is discharged from the machine. Motion is imparted to one of the square shafts $k$ by a cog-gear, $m$, on said shaft, which engages with the cogs on the driving-wheel of the machine. The other square shaft $k$ is rotated by a pinion on one square shaft engaging with a similar pinion on the other shaft, in the usual manner, this construction being common.

The seed-openings $i$ in the bottom of the seed-compartment $d$ are countersunk therein, or made concave.

$n$ represents a gage or keeper provided with a straight arm, $n'$, having a slot, $n^2$, for the passage of a set-screw, which passes thence into the bottom of the grain-hopper, near the circumference of the seed-openings $i$, whereby the keeper or gage can be adjusted, as desired. The keeper is bent around at $n^3$ to conform to the countersunk seed-opening $i$, and is then bent at $n^4$, where it leaves the countersunk part of the seed-opening, and is tapered at its lower end, at $n^5$, to a point, so as to lie between the gum-rollers and prevent any lateral escape of the grain between the rolls.

The bottom of the fertilizer-hopper $e$ is provided with one or more openings, $o$, and a long rectangular recess, $o'$, provided with branch diagonal recesses $o^2$ on one side of the long recess cut out of the bottom of the hopper and lying adjacent to the openings $o$ for the reception of the similarly-formed slide $o^3$, having the rectangular part $o^4$ and inclined branches $o^5$, adapted to fit and slide in the recess. The bottom face of the rectangular part of the slide $o^3$ is provided with a lug, $o^6$, which projects through a slot in the bottom of the fertilizer-hopper, and is connected by a rod, $o^7$, with an arm, $o^8$, secured to a vertical rock-shaft, $o^9$, pivoted in the frame of the machine.

$o^{10}$ is a horizontal arm secured to the rock-shaft $o^9$ and connected by the rod $o^{11}$, with the eccentrically-pivoted boot-roller, whereby the slide $o^3$ is operated when desired, and the openings in the fertilizer-hopper closed in turning the machine.

$p$ represents the metal bottom of the fertilizer-hopper, and consists of a rectangular part, $p'$, secured to the bottom of the fertilizer-hopper, provided with holes for the reception of the lower ends of the stirrer-shafts $s$, and provided with branch arms $p^2$ on one side of its rectangular part, with recesses $p^3$ between them to allow the passage to and fro of the branch arms $t'$ of the slide $t$, having the rectangular part $t^2$, branch arms $t'$, and recesses $t^3$ between them. The slide $t$ is operated in the ordinary manner to close entirely the flow of fertilizer, or to set the slide so as to sow a certain quantity to the acre. Each of the vertical stirrer-shafts $s$ has its lower bearing in one of the holes made in the metal bottom $p$, and passes through a cylindrical hole, $s'$, in the body of the stirrer $s^2$, provided with the bifurcated arms, $s^3$, making an angle with each other. The upper face of the stirrer $s^2$ is provided with opposite notches, $s^6$, for the reception of the elongated pin or arm $s^5$, which passes directly through the vertical stirrer-shaft $s$ and rests in the notches $s^6$ in the upper face of the stirrer. The elongated pin or arm $s^5$ can readily be removed from or replaced in its hole $s'$ in the stirrer-shaft, so that the stirrer-shaft can be detached from its stirrer or the parts united together when desired. It will be seen from this construction that the pin or arm $s^5$ serves the threefold purpose of connecting the stirrer to its shaft and readily detaching it therefrom when desired, and at the same time acts as a stirrer-arm. $t^4$ represents an arm provided with a circular hole, through which the upper end of the stirrer-shaft $s$ passes, and is secured and adjusted therein, as desired, by means of set-screw $t^5$ passing through a hole in the arm and made to bear against the stirrer-shaft.

$t^6$ is a right-angular projection on the inner end of the arm $t^4$, which, in common with the angular projections on the arms similarly connected with their stirrer-shafts, all pass through holes in a bar, $t^7$, to which they are secured by nuts and washers or other equivalent means.

On the inner face of the cog-gear $m$, operated by the driving-wheel, is a gear-wheel, $u$, which gears into a bevel-pinion, $u'$, on the lower end of a shaft carrying a horizontal crank, $u^2$, on its upper end, provided with a pitman, $u^3$, secured to the bar $t^7$, whereby a reciprocating motion is imparted to the latter and a rocking motion to the stirrers.

In order to protect the parts from dirt or injury, it is obviously advisable that the reciprocating bar that operates the stirrers and the means for operating the same should be within the hopper. To accomplish this result the partition $c$ between the hoppers is provided with a series of recesses, $c'$, for the passage of the arms $t^4$, and the bar $t^7$ is arranged below the cover of the hopper.

$v$ represents the center piece of the hopper-cover, and is provided with two end holes, $v'$, and a middle hole, $v^2$, for the passage of threaded strap-bolts $v^3$, secured to the inside of the hopper and provided with nuts, whereby the center piece is attached to the hopper. The lower face of the center piece, $v$, is provided with metallic plates $v^4$, having central holes, which serve as bearings for the upper ends of the stirrer-shafts $s$. The cover $v^5$ of the fertilizer-hopper is hinged to the center piece, $v$. By this construction it will be seen that the center piece and hopper-cover can readily be removed and the interior of the hopper cleaned.

Having thus fully described my invention, what I claim as new, and desire to secure by Letters Patent, is—

1. The combination, with the concave seed-opening $i$, gum rollers $l$, and seed-slide, of the adjustable slotted gage or keeper $n$, rounded at $n^3$ to conform to the countersunk seed-opening, bent at $n^4$, and tapered to a point at its lower end, at $n^5$, so as to lie between the gum rollers, substantially as described, whereby any lateral escape of grain between the rolls is prevented, as set forth.

2. The combination, with the fertilizer-hopper $e$, having in its bottom one or more openings, $o$, a rectangular recess, $o'$, and diagonal recesses $o^2$, and slide $o^3$, provided with the rectangular part $o^4$ and inclined branches $o^5$, adapted to slide in the recess in the bottom of the fertilizer-hopper, of the rod $o^7$, vertical rock-shaft $o^9$, provided with horizontal arms $o^8$ $o^{10}$, rod $o^{11}$, and centrally-pivoted boot-roller, substantially as described, whereby the fertilizer-openings are closed in turning the machine, or when the boots are raised, as set forth.

3. The combination, with a stirrer-shaft, $s$, provided with a hole, $s'$, near its lower end, and a stirrer, $s^2$, having notches $s^6$ in its upper face, and arms $s^3$, of the removable elongated rod or arm $s^5$, passing through the hole near the lower end of the stirrer-shaft, and resting in the notches $s^6$, substantially as described, whereby said rod or arm $s^5$ serves the threefold purpose of connecting the stirrer to the shaft and permitting of its ready removal when desired, and at the same time itself acts as a stirrer-arm, as set forth.

4. The combination, with the longitudinal partition $c$, provided with recesses $c'$ along its upper edge, and stirrer-shafts $s$, of the adjustable arms $t^4$, each having an angular projection, $t^6$, bar $t^7$, and mechanism for reciprocating said bar, substantially as described, whereby the bar is arranged to lie within the hopper, and is protected from dirt and injury, as set forth.

The above specification of my invention signed by me in the presence of two subscribing witnesses.

DAVIT F. HULL.

Witnesses:
CHAS. A. PETTIT,
JOHN T. LAWRENCE.